United States Patent [19]
Frederick

[11] Patent Number: 4,944,887
[45] Date of Patent: Jul. 31, 1990

[54] REGENERATIVE DIATOMACEOUS EARTH FILTER

[75] Inventor: Stanley H. Frederick, Sanford, N.C.

[73] Assignee: Essef, Chardon, Ohio

[21] Appl. No.: 296,611

[22] Filed: Jan. 13, 1989

[51] Int. Cl.$^5$ .............................................. B01D 37/02
[52] U.S. Cl. .................................. 210/778; 210/791;
    210/193; 210/383; 210/398; 210/412; 210/486
[58] Field of Search ............... 210/798, 791, 193, 351,
    210/383, 384, 388, 486, 497.1, 391, 398, 412

[56]        References Cited
          U.S. PATENT DOCUMENTS

| | | | |
|---|---|---|---|
| 2,301,430 | 11/1942 | Malanowski | 210/388 |
| 2,460,416 | 9/1945 | Goodrich | 210/388 |
| 2,874,848 | 2/1959 | Cannon et al. | 210/388 |
| 3,195,729 | 7/1965 | Kracklauer et al. | 210/388 |
| 3,202,284 | 8/1965 | Wade | 210/345 |
| 3,212,643 | 10/1965 | Schmidt et al. | 210/388 |
| 3,522,886 | 8/1970 | Edmiston et al. | 210/345 |
| 3,774,772 | 11/1973 | Yeths | 210/169 |
| 4,277,337 | 7/1981 | Zdansky | 210/193 |

*Primary Examiner*—Ivars C. Cintins
*Attorney, Agent, or Firm*—Pearne, Gordon, McCoy & Granger

[57] ABSTRACT

A fluid filter is disclosed which includes a casing defining a fluid chamber with inlet and outlet apertures to and from the chamber to respectively conduct unfiltered fluid to the chamber and filtered fluid from the chamber. A flow path is defined within the chamber and a filter is interposed in the flow path substantially normal to the direction of flow of the fluid in the chamber. The filter includes a screen having a covering of a filter aid, such as diatomaceous earth, on an upstream side of the screen. The filter is regenerated by reciprocating the screen relative to the casing in a path corresponding to the path defined by the direction of flow.

13 Claims, 3 Drawing Sheets

REGENERATIVE DIATOMACEOUS EARTH FILTER

BACKGROUND OF THE INVENTION

This invention relates to filter techniques and, more particularly, to swimming pool filtration devices employing a filter aid to remove suspended solids from water.

Continuous flow filter devices wherein water in the pool is pumped continuously therefrom and into the filter device to clean the water and to return the water to the pool in a continuous cycle are usually sand filters, cartridge filters, diatomaceous earth filters, or a combination of these filters. Sand filters, however, do not remove suspended solids and, in fact, may add to the concentration of suspended solids in the pool. Cartridge filters are expensive, since periodic replacement of the cartridge filter medium is required. By far, the most effective filter for swimming pools is a filter having a filter aid, such as diatomaceous earth, coated on a septum or screen to effectively filter out suspended substances in the water.

Diatomaceous earth filters have a filtration cycle which includes precoating the septum or screen with a relatively thin layer of diatomaceous earth by flowing water through the screen in the filtration direction, filtering impure water by capturing the suspended solids in the water in the minute openings of the diatomaceous earth particles, and, after a predetermined amount of impurities has been collected in the diatomaceous earth, removing the filter cake from the septum. The effectiveness and commercial acceptability of a diatomaceous earth filter depends largely upon the removal of filter cake from the septum and the ease of redepositing the diatomaceous earth onto the septum.

Various techniques have been proposed to accomplish this portion of the filtration cycle. Many techniques which are still employed today involve backwashing, which consists of reversing the flow of water through the filter elements and flushing the spent cake to waste. This technique is expensive since the diatomaceous earth must be added to the filter and since large amounts of water are required to completely clean the septum. Moreover, in communities having a high concentration of swimming pools, diatomaceous earth may tend to clog the sewer systems. Some communities, moreover, have banned the dumping of diatomaceous earth in the community sewer system.

A second type of filter is a regenerative filter which generally does not require backwashing flow but includes elements which can be flexed or mechanically bumped to remove the filter cake, or can be spun to remove the cake by centrifugal force. Filters which are flexed to remove the filter cake are described in U.S. Pat. Nos. 3,100,190 and 3,642,141. Filters which are spun to remove the filter cake are described in U.S. Pat. No. 3,069,014. Spinning a disc-shaped filter element to remove filter cake is not particularly effective, since the spinning action results in little, if any, turbulence of the water within the filter casing, and this action relies primarily on centrifugal force to remove the contaminated diatomaceous earth. The centrifugal force, of course, decreases as the spin axis is approached.

SUMMARY OF THE INVENTION

This invention provides a diatomaceous earth filter which has a casing defining a fluid chamber and inlet and outlet apertures to and from the chamber to respectively conduct unfiltered fluid to the chamber and filtered fluid from the chamber. A flow path is defined within the fluid chamber between the inlet and outlet apertures, and a septum is interposed in the flow path substantially normal to the direction of flow of the fluid within the chamber. The septum comprises a screen having a covering of a filter aid, such as diatomaceous earth, on an upstream side of the septum or screen to entrap suspended solids. After a predetermined amount of fluid has passed through the filter, or when the pressure drops between the fluid inlet and outlet apertures indicate that the filter is substantially blinded by impurities, the filter element is regenerated by removing the contaminated filter cake from the septum so that the diatomaceous earth and the impurities may be redistributed over the septum for further filtration.

The removal of the filter cakes is accomplished by moving the screen of septum back and forth along the path defined by the direction of flow of the fluid within the chamber during normal filtering operations. This movement creates turbulence in the water within the casing to strip the filter cake from the septum. The reciprocating movement of the filter unit also causes the water to surge through the septum in alternate directions corresponding to the direction of normal flow through the filter and countercurrent thereto. This surging action provides a highly efficient technique for removing diatomaceous earth and impurities from the septum in that it simulates a backwashing operation as the water is forced through the septum in a direction opposite to the direction of normal filter flow.

The fluid filter according to one aspect of the present invention includes a plurality of filtering units which comprise septum compartments radiating in a spiral fashion from the axis of the filter chamber. Each filter unit comprises spaced screens which define a downstream filter chamber for receiving filtered water, and each downstream filter chamber is connected by way of a manifold to a filtered water outlet in the filter casing. An inlet to the casing delivers contaminated water to the filter casing. A predetermined amount of diatomaceous earth or other filter aid is added to the unit and, upon flowing water through the unit, a diatomaceous earth coating having a thickness of about one-quarter inch to three-eighths inch is accumulated on the outside of each filter unit which is defined by a septum or screen.

With a total septum area of 10 square feet, about 4 pounds of diatomaceous earth may be used. When the pressure drop through the filter reaches a predetermined level, the diatomaceous earth cake may be regenerated. To accomplish regeneration, the filter units are mounted so that they may be axially rotated within the casing by a handle which axially projects through the filter casing. The handle is rotated through an arc of about 60 degrees between stop members so that each filter unit is washed and is abruptly stopped or bumped by the mechanical stops in the filter unit. When the dirt-to-diatomaceous earth ratio reaches about 1:1, the filter is drained so that the diatomaceous earth may be replaced.

DETAILED DESCRIPTION OF THE INVENTION

Figure 1:
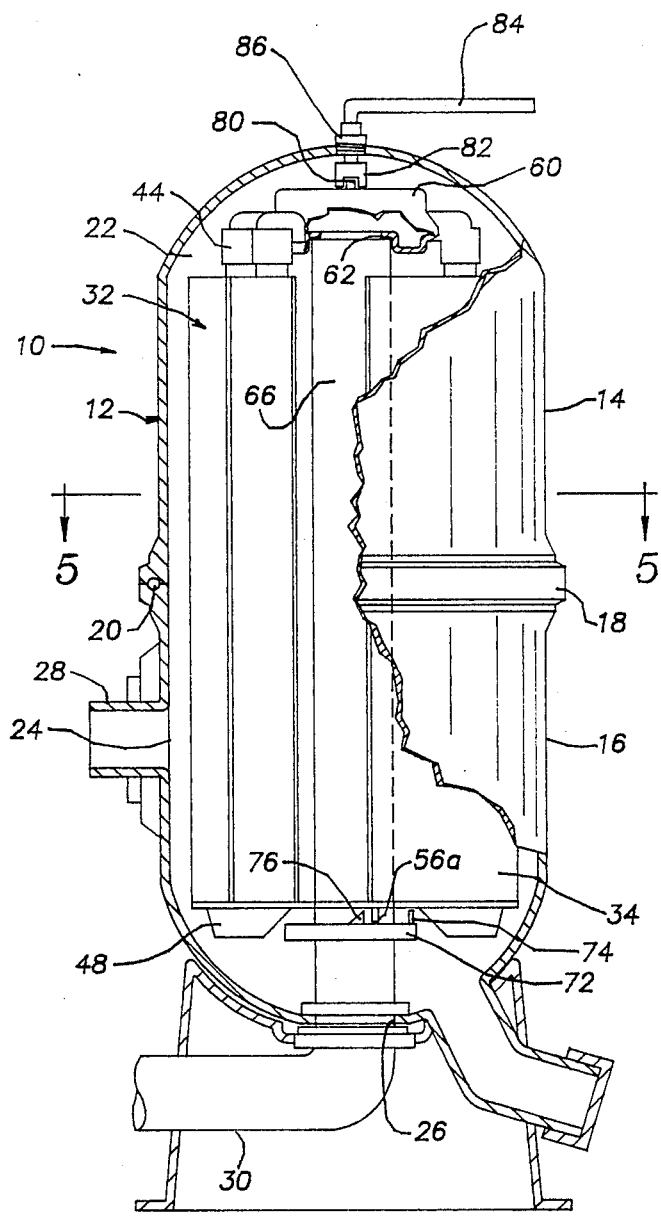
FIG. 1 is an elevational view of a filter according to the present invention, with portions broken away for clarity.
Figure 2:
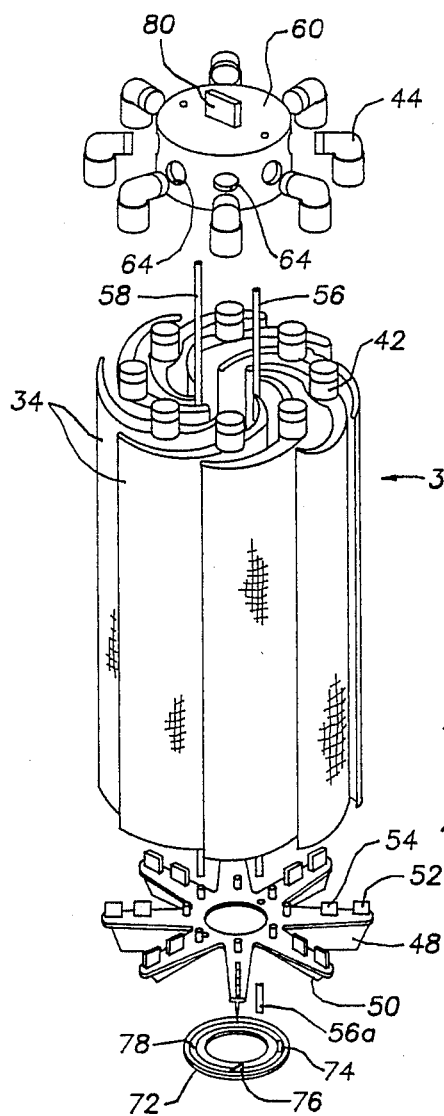
FIG. 2 is an exploded view of the filter units employed in the filter.

Referring now to the drawing, and particularly to FIGS. 1 and 2, a water filter 10 is illustrated. The water filter 10 includes a cylindrical casing 12 which may be constructed from a suitable stainless steel or plastic material and which includes a pair of mating halves 14 and 16 held together by a clamping band 18 and sealed in mouth-to-mouth apposition by an O-ring 20

The casingg 12 defines a fluid chamber 22 having inlet and outlet apertures 24 and 26, respectively. The inlet aperture 24 is connected by a pipe 28 to a suitable pump (not shown) which draws contaminated water from the swimming pool and the outlet aperture 26 is connected to a pipe 30 which returns the water to the pool. As is customary, the pipes 28 and 30 may be connected to a suitable selector valve to permit the flow to be reversed for backwashing operations and to permit the pool to be filled or drained. As will be apparent, however, the filter according to this invention need not be backwashed in the customary manner, but may be regenerated without reversing the flow through the filter.

During normal service operation, a flow path is defined within the chamber 22 between the apertures 24 and 26 which is provided with a filter unit 32 interposed in the flow path substantially normal to the direction of flow of the fluid within the chamber 22.

Figure 4:
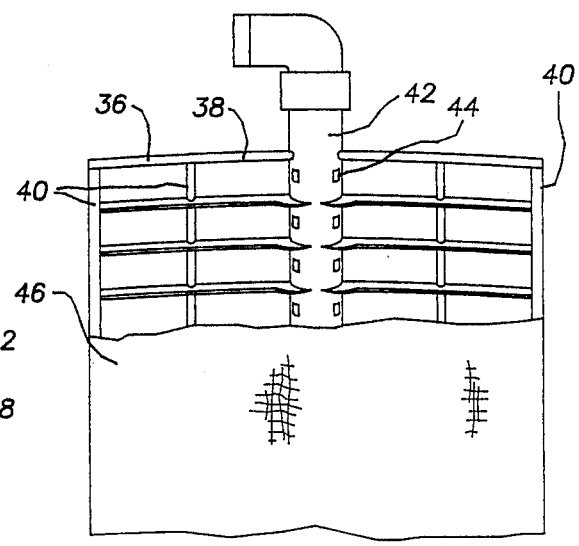
FIG. 4 is a perspective view of a filter unit according to this invention, with portions broken away for clarity.

The filter unit includes a plurality of filter grids 34 which radiate in a spiral fashion. As may be seen most clearly in FIG. 4, each filter grid 34 is comprised of a supporting frame 36 which comprises a lattice of horizontal slats 38 and vertical supports 40. The slats 38 radiate from a tube 42 which is provided with a multiplicity of apertures 44 generally located between adjacent slats 38. The frame 36 is covered with porous cloth 46 so that each grid 34 comprises a screen or septum defining a filter compartment for filtering fluids.

Each grid 34 is mounted on a grid retainer 48 having a plurality of radially extending spokes 50. Each spoke 50 carries a pair of tabs 52 and 54 which serve to retain a grid 34 therebetween. A pair of tie rods 56 and 58 are fixed at one end to the grid retainer 48 and are fixed at their other ends to a collection manifold 60. The collection manifold 60 has an axial opening 62 and a plurality of radial openings 64 which correspond in number to the number of tubes 42. Each tube 42 is connected to the interior of the manifold by an elbow 44 and the opening 62 is rotatably mounted on a stationary pipe 66 which, in turn, is in fluid communication with the outlet aperture 26. The manifold 60 is fixed to the grid retainer 48 by the tie rods 56 and 58, which clamps the manifold 60, the grids 34, and the grid retainer 48 together as a unit.

Figure 3:
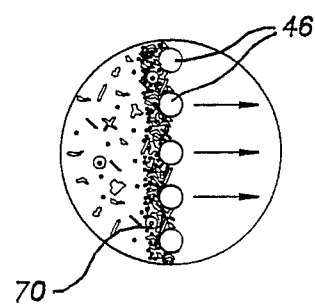
FIG. 3 is a diagrammatic view of the filter cake formed on the screen or septum.

To initially condition the screen or septum for filtering operations, a predetermined amount of diatomaceous earth or other filter aid is placed in the chamber 22. For example, for a screen or septum area of 10 square feet, and for an above-ground pool of up to 10,000 gallons, four pounds (1.6 quarts) of diatomaceous earth is used to build up a filter cake 70 (FIG. 3) of between about one-quarter to three-eights inch in thickness. This precoating operation is performed by pumping the water through the filter at a flow rate at least as great as the filtering rate during service. The water enters the chamber 22 by way of the aperture 24 and enters the septum or screen at an angle which is substantially normal to the surface of the screen or septum 46. The water then flows through the elbows 44, the manifold 60, the pipe 66, and out through the pipe 30 to the pool. However, during precoating operations, a slight amount of the filter aid may bleed through the septum and, for this reason, flow may be either recirculated or run to waste. As may be seen in FIG. 3, the filter aid particles bridge the openings of the septum and form a microscopically fine screen which is much finer than the septum itself. The filter cake now serves as the filter medium, and the septum merely serves as a support for the filter aid.

Surface filtration is continued until the resistance of the filter cake has increased to a point when, depending upon the mode of control, either the pressure drop or the filtration rate, or a combination of the two, has reached a predetermined limit. Flow through the filter is then stopped and the filter cake and its deposited impurities are regenerated by removing the filter cake from the septum and rearranging the cake and its contaminants back on the septum. This is accomplished in a manner which will now be explained.

As may be seen in FIGS. 1 and 2, a stationary ring 72 is fixed to the lower end of the pipe 66. The ring 72 is provided with a pair of spaced stop members 74 and 76, which are located within an annular track 78. An extension 56a of the rod 56 projects into the track 78 between the abutments 74 and 76 so that the assembly, comprising the manifold 60, the grids 34, and the grid support 48, is movable as a unit about the pipe 66, with such movement limited by the extension 56a abutting the abutments 74 or 76. The movement is desirably limited to about 60 degrees, which is the spacing between the abutments 74 and 76. To move the grids 34 in this manner, a projecting tab 80 is provided on the manifold 60 and the tab 80 is engaged by a yoke 82 which is driven by a crank arm 84 mounted in a sealed bearing 86 in the top of the tank 12.

By moving the crank arm 84 back and forth, the grids 64 are moved through an arc of 60 degrees, with the limits of travel being determined by the stops or abutments 74 and 76 against which the projection 56a impacts. The bumping action and sudden reversal of the direction of movement of the grids 34 cause the filter aid and impurities deposited thereon to be dislodged.

Figure 5:
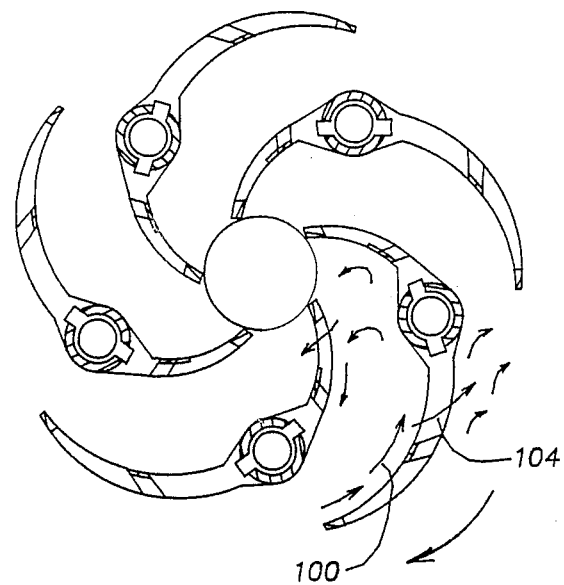
FIG. 5 is a sectional view, the plane of the section being indicated by the line 5—5 of FIG. 1, showing idealized lines of turbulence created upon regenerating the filter cake by moving the filter unit in a clockwise direction.
Figure 6:
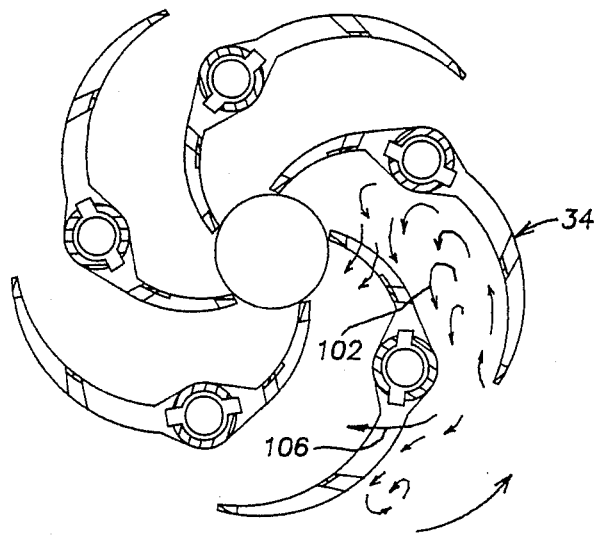
FIG. 6 is a sectional view, similar to FIG. 5, but showing the idealized lines of turbulence created upon regenerating the filter cake by moving the filter unit in a counterclockwise direction.

Another important aspect of the removal of the filter coat is that during the back-and-forth movement of the filter grids, considerable turbulence is created within the chamber 22. This turbulence is illustrated by the arrows 100 in FIG. 5 when the grids 34 are rotated in a clockwise direction and by the arrows 102 in FIG. 6 when the grids 34 are rotated in a counterclockwise direction. While the indicated flow is somewhat idealized by the arrows 100 and 102, the turbulent flow across the screen surface of the grids 34 tends to scrub the filter cake from the screen. Moreover, it may be noted that as the filter cake is being removed by turbulent flow at the surface of the grids, this flow will also tend to pass through the grids to remove embedded filter cakes from the screen mesh on alternate sides of the grid 34, as is indicated by the arrows 104 and 106 in FIGS. 5 and 6, respectively. This cleaning action as indicated by the arrows 104 and 106 is equivalent to a conventional backwashing operation, wherein the flow of water through the filter is reversed so that the water flows from the pool through the pipe 30 and to the interior of the grids 32 to backflush the grids 32 and exit the filter through the pipe 24 to be routed by the valve (not shown) to drain. In accordance with the present invention, no such reverse flow is necessary, but filter backwashing is accomplished by the previously described swishing action of the filter grids.

Figure 7:
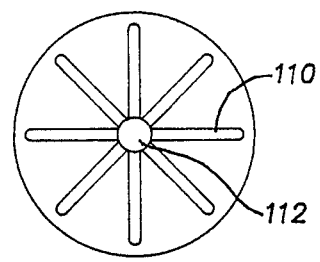
FIG. 7 is a schematic plan view of a filter unit according to a further aspect of this invention.
Figure 8:
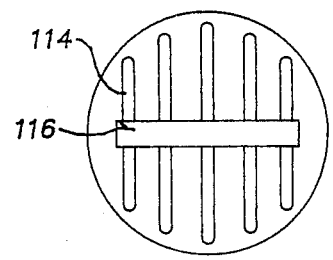
FIG. 8 is a schematic plan view of a filter unit according to a still further aspect of this invention.

While the invention has been described with reference to a filter having grids of the configuration shown in FIGS. 1 through 5, the grids may radiate linearly from the tank axis, as is indicated schematically by the grids 110 in FIG. 7. The grids 110 are associated with a manifold 112. Similarly, and as is illustrated in FIG. 8, flat grids 114 may be positioned as cords of the circle defined by the cylindrical filter tank. The grids 114 may be associated with a manifold 116.

It may be noted that the diatomaceous earth 70 eventually may be replaced with a fresh chargge by removing the clamping band 18 and the mating half 14, together with the handle 84. The entire filter unit 32, together with the manifold 60 and the grid support 50, may be removed from the mating half 16 so that the spent diatomaceous earth 70 may be washed for the bottom half 16 and the filter grids.

It should now be appreciated that so long as the plane of a grid is not oriented in the direction of travel of the grid, during reciprocations thereof the benefits of the present invention obtain.

Although the preferred embodiment of this invention has been shown and described, it should be understood that various modifications and rearrangements of the parts may be resorted to without departing from the scope of the invention as disclosed and claimed herein.

What is claimed is:

1. A fluid filter comprising a casing defining a fluid chamber and inlet and outlet apertures to and from said chamber to respectively conduct unfiltered fluid to said chamber and filter fluid from said chamber, means defining a flow path within said chamber between said apertures, filter means interposed in said flow path substantially normal to a direction of flow of said fluid within said chamber, said fliter means comprising screen means defining a filter compartment having a covering of a filter aid on an upstream side of said screen means, and means to regenerate said filter aid by removing said filter aid from said screen means, including means to rotationally reciprocate said screen means relative to said casing and in an arcuate reciprocation path corresponding to the path definded by the direction of flow through said filter means and further including stop means at both ends of said path to limit the extent of said reciprocation path, the extent of said path permitting fluid to flow entirely through said compartment upon reciprocation of said screen means.

2. A fluid filter according to claim 1, wherein said screen means defines a surface which is angularly related to the direction of reciprocation of said screen means.

3. A fluid filter according to claim 1, wherein said filter aid is diatomaceous earth.

4. A fluid filter according to claim 1, wherein said chamber is cylindrical, wherein said filter means comprises a plurality of filter grids comprising a lattice of horizontal slats and vertical supports, and wherein a screen covers each said lattice to define a plurality of collection chambers.

5. A fluid fliter according to claim 4, wherein said filter grids radiate in a spiral fashion from the longitudinal axis of said chamber.

6. A fluid filter according to claim 5, wherein said filter grids are clamped between an upper collection manifold and a lower grid retainer, and pipe means connecting each collection chamber with the interior of said manifold.

7. A fluid filter according to claim 6, wherein said upper collection manifold and said lower grid retainer are clamped on said filter grids by tie rods fastened to and extending between said collection manifold and said lower grid retainer.

8. A fluid filter according to claim 7, wherein said manifold is in fluid communication with the upper end of a stationary pipe which extends into said casing and which is coaxial with the axis of said cylinder, bearing means between said pipe and said manifold permitting relative movement between said manifold and said pipe.

9. A fluid filter according to claim 8, wherein handle means axially projects through the top of the casing and is in driving engagement with said manifold so that the manifold, the filter unit, and the grid retainer may be rotated as a unit about said stationary pipe, a ring fixed to said pipe beneath said filter unit, said ring having a pair of arcuately spaced abutments thereon, and means depending from said grid retainer into an arcuate path between said abutments and engaging each abutment upon rotation of said handle.

10. A fluid filter according to claim 9, wherein said means depending from said grid retainer comprises one of said tie rods and wherein said arcuate path is defined by an annular track formed in said ring.

11. A fluid filter according to claim 9, wherein the arcuate spacing between said abutments is 60 degrees.

12. A method of filtering fluid with a filter aid deposited on screen means and for regenerating impurity-laden filter aid on the screen means, comprising the steps of entraining a quantity of filter aid in an impurity-laden stream of fluid to be filtered, causing said fluid to flow through said screen means in a direction substantially normal to said screen means to deposit a coating of filter aid as a filter cake on said screen means and to remove impurities from said fluid by entraining said impurities in said filter aid to form an impurity-entrained filter cake, and, after a predetermined amount of impurities has been so entrained, regenerating said filter cake by creasing said flow and, while retaining a body of said fluid about said screen, arcuately reciprocating said screen means relative to said fluid and along a path substantially normal to said screen means to remove said impurity-entrained filter cake, and resuming said flow to redeposit a coating of filter aid as a filter cake on said screen means.

13. A method of filtering according claim 12, wherein said screen means is reciprocated through an arc of about 60 degrees.

* * * * *